G. W. GREEN & J. McI. CATER.
TRACK CLEANER.
APPLICATION FILED MAR. 27, 1912.
1,089,636.
Patented Mar. 10, 1914.
5 SHEETS—SHEET 1.
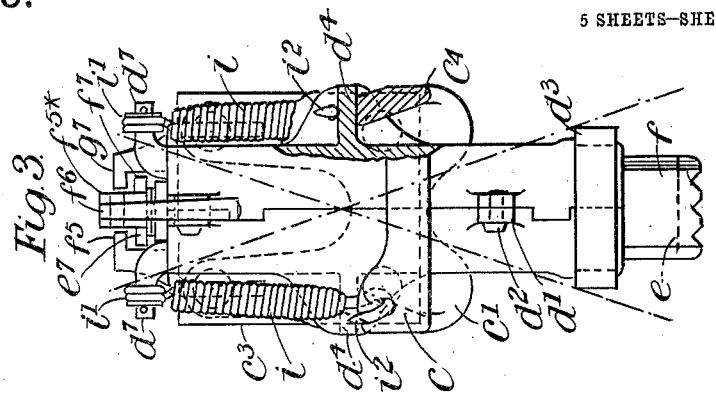
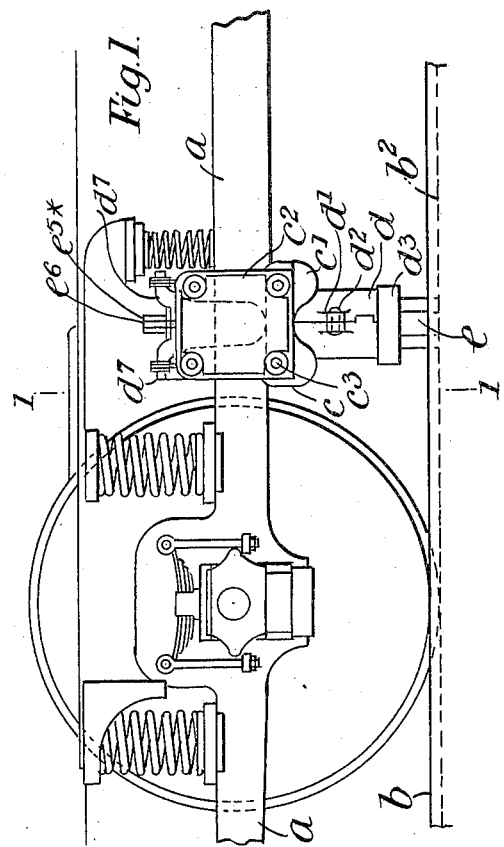
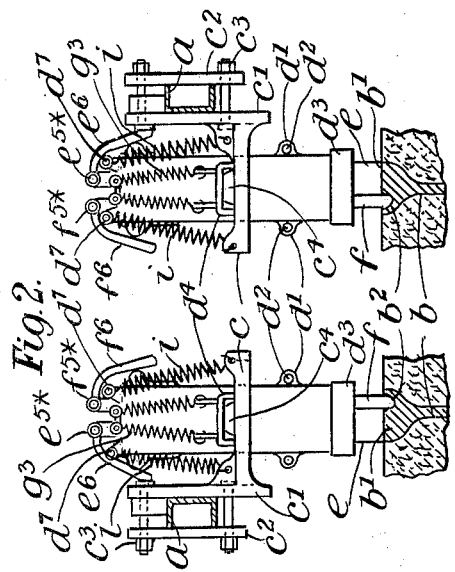
WITNESSES:
John C. Sanders
Albert F. Heuman
INVENTORS:
George William Green
John McIlvaine Cater
BY
ATT'Y.

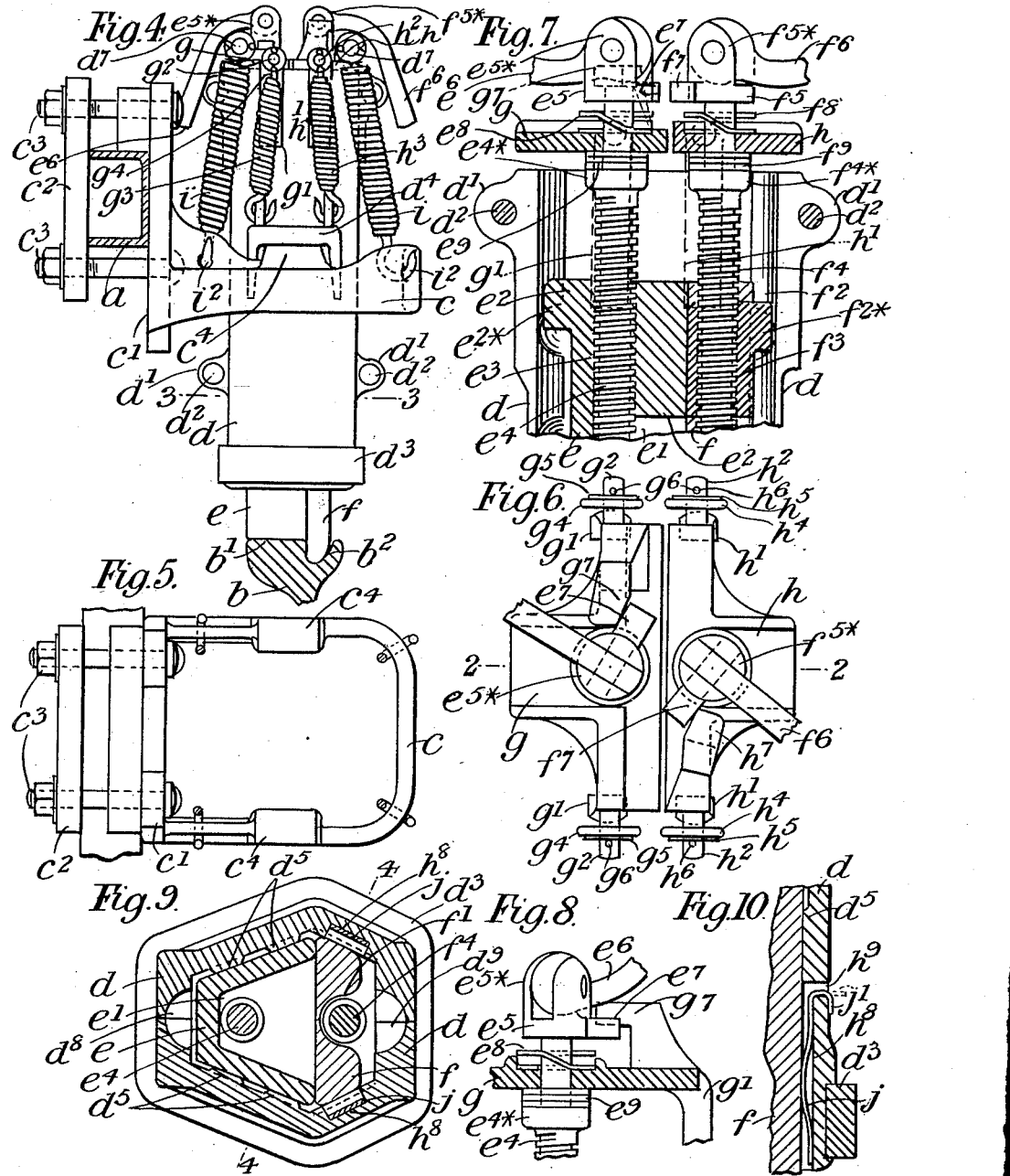

G. W. GREEN & J. McI. CATER.
TRACK CLEANER.
APPLICATION FILED MAR. 27, 1912.
1,089,636.
Patented Mar. 10, 1914.
5 SHEETS—SHEET 3.
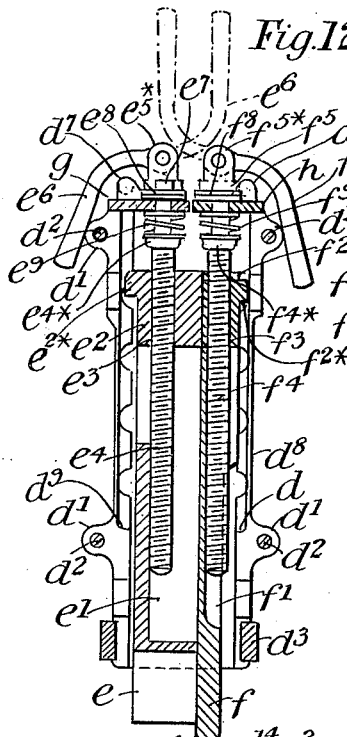
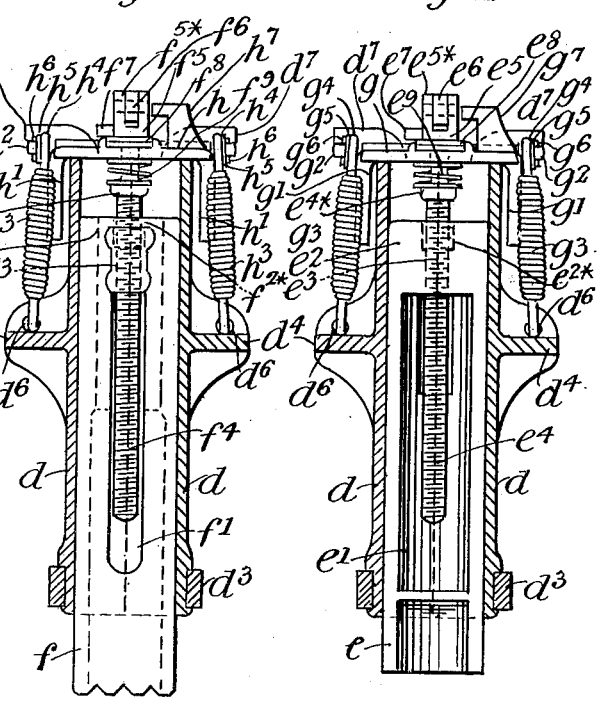
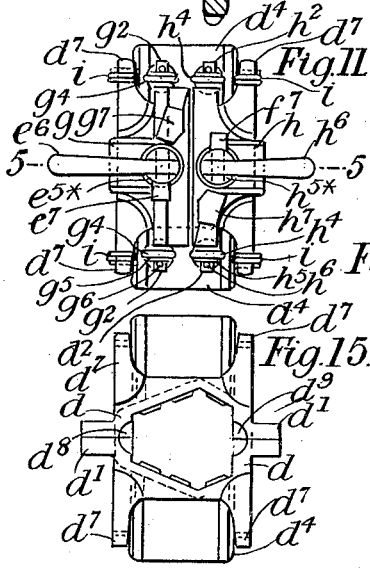

G. W. GREEN & J. McI. CATER.
TRACK CLEANER.
APPLICATION FILED MAR. 27, 1912.
1,089,636.
Patented Mar. 10, 1914.
5 SHEETS—SHEET 5.
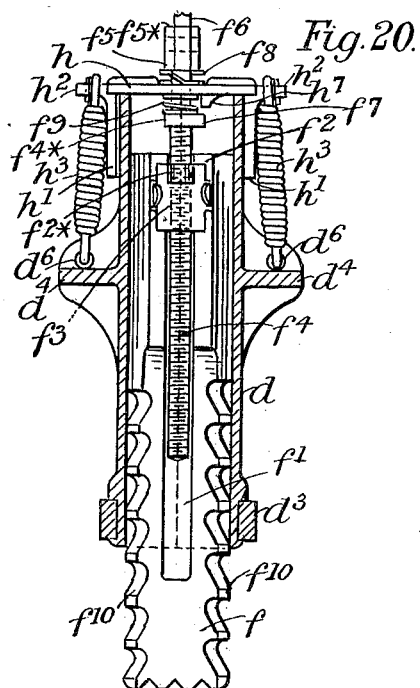
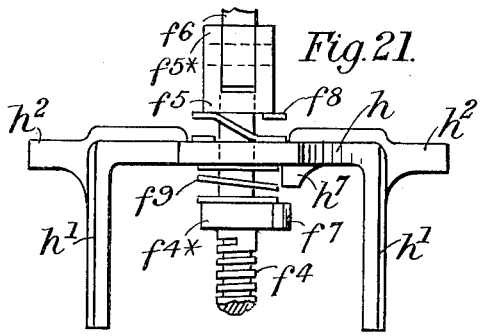
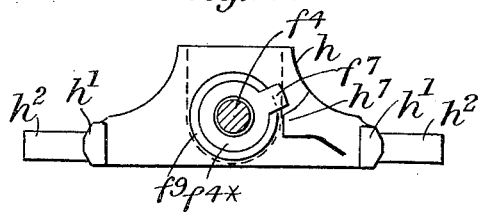
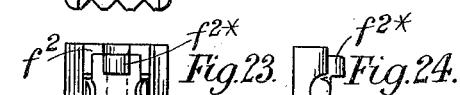
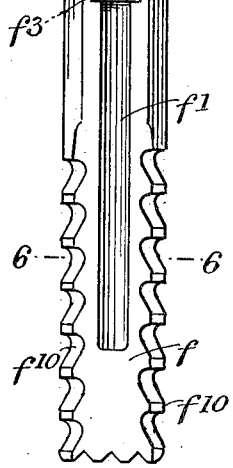
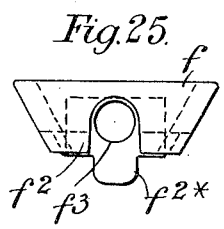
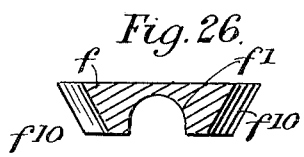
WITNESSES:
John C. Sanders
Albert F. Heuman
INVENTORS:
George William Green
John McIlwaine Cater
BY
ATTY.
COLUMBIA PLANOGRAPH CO., WASHINGTON, D. C.

UNITED STATES PATENT OFFICE.

GEORGE WILLIAM GREEN, OF FELTHAM, AND JOHN McILVAINE CATER, OF LONDON, ENGLAND.

TRACK-CLEANER.

1,089,636.  Specification of Letters Patent.  Patented Mar. 10, 1914.

Application filed March 27, 1912. Serial No. 686,546.

*To all whom it may concern:*

Be it known that we, GEORGE WILLIAM GREEN and JOHN McILVAINE CATER, subjects of the King of Great Britain, the former residing at Feltham, in the county of Middlesex, England, and the latter in the city of London, England, have invented certain new and useful Improvements in Track-Cleaners, of which the following is a specification, reference being had to the drawings hereunto annexed and to the figures and letters marked thereon—that is to say:

The invention relates primarily to that class of rail cleaner in which two blades are mounted in a case or sleeve with capability of vertically sliding, one or more of said devices being arranged at each side of the vehicle so that either the tread or groove of each rail or both tread and groove may be cleared of foreign matter or obstructions.

The invention consists in certain improvements in the details of construction of devices of the character above referred to, said improvements having for their object to improve the general efficiency of said devices, to cause the cleaners to bear with an elastic pressure capable of regulation upon the rail, to regulate said pressure, to compensate for wear of parts and to otherwise improve the device as fully set forth.

Figure 18:
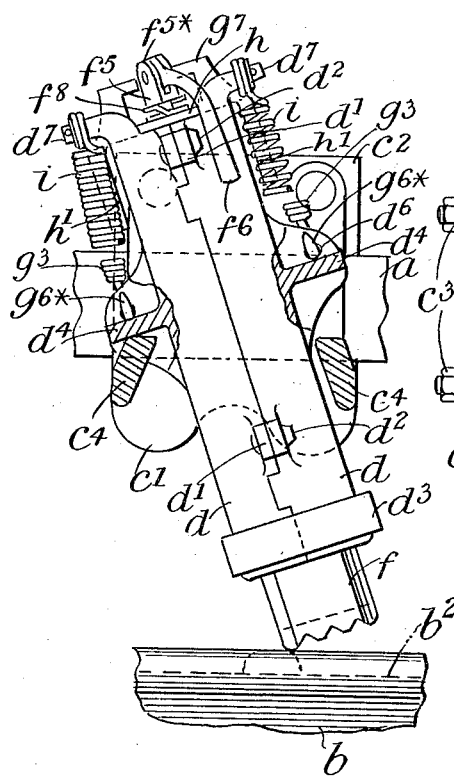
Figure 19:
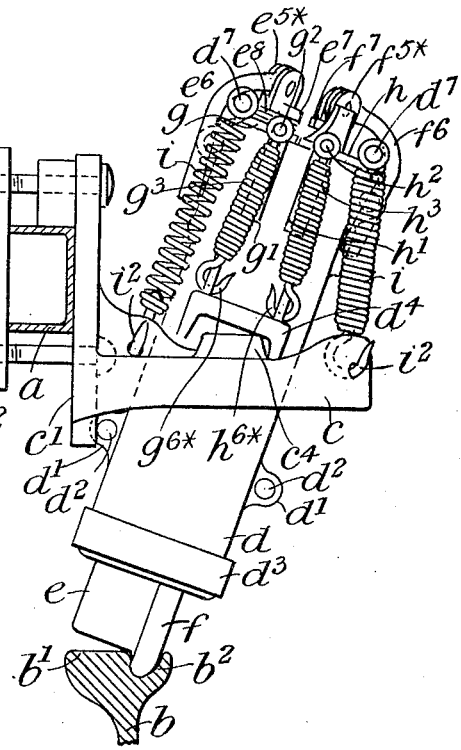

In the accompanying drawings:—Figure 1 is a side elevation of a railway or tramway vehicle having applied thereto a rail cleaner embodying the present improvements. Fig. 2 is a vertical transverse sectional view, the section being taken on the line 1—1 of Fig. 1 showing the position of the cleaners with relation to the frame of the vehicle and the rails. Fig. 3 is a side elevation partly in section of a cleaner showing the parts with a slight pressure upon the blades. Fig. 4 is an end elevation of Fig. 3. Fig. 5 is a plan of the bracket for attaching the device to the frame of the vehicle. Fig. 6 is a part plan of the top part of the device showing full pressure applied to the blades. Fig. 7 is a vertical section taken on the line 2—2 of Fig. 6. Fig. 8 is a detail view of part of Fig. 7 and taken at right angles thereto. Fig. 9 is a horizontal section taken on the line 3—3 of Fig. 4. Fig. 10 is a part vertical section taken on the line 4—4 of Fig. 9. Fig. 11 is a complete plan of the top of the device showing the parts in the positions they would assume with a slight pressure applied to the blades. Fig. 12 is a vertical section taken on the line 5—5 of Fig. 11. Fig. 13 is an interior view of half of the device with some parts removed showing more particularly the groove blade. Fig. 14 is a similar view of the other half of the device showing more particularly the tread blade. Fig. 15 is a plan of the complete case or sleeve for the blades with the blades removed. Fig. 16 is an interior view of one half of the casing. Fig. 17 is a similar view of the other half of the casing. Fig. 18 is a side elevation of the device showing the positions assumed by the parts when the groove blade is passing over an obstruction. Fig. 19 is an end elevation of the device showing the positions assumed by the parts when the vehicle is rounding a sharp curve. Fig. 20 is a similar view to Fig. 13 illustrating a modified form of blade and a modified arrangement of stop for the screw. Fig. 21 is a detail view of the bridge piece and connected parts illustrating more particularly the modified stop for the screw. Fig. 22 is an underside view of Fig. 21. Fig. 23 is a face view of the modified blade. Fig. 24 is a side elevation thereof. Fig. 25 is a plan of Fig. 23 and Fig. 26 is a horizontal section taken on the line 6—6 of Fig. 23.

In the several figures like parts are indicated by similar letters of reference and Figs. 3 to 5 and 11 to 20 and 23 and 24 are drawn to an increased scale and Figs. 6 to 10 and 21, 22, 25 and 26 are drawn to a further increased scale with respect to the other figures of the drawings.

$a$ represents the frame or under-carriage of the vehicle, $b$ represents the rails or track and $c'$ represents the vertical base of a bracket $c$ which is securely fixed to the frame $a$ of the vehicle by means of a clamping plate $c^2$ and bolts and nuts $c^3$.

The bracket $c$ consists of a horizontal frame which is formed on or fixed to the base $c'$ and is provided on opposite sides with vertical tapered lugs $c^4$. Loosely fitting within the frame $c$ is a case or sleeve $d$ formed in two parts vertically divided, said parts being provided with matching lugs $d'$ perforated to receive rivets $d^2$ by which the two parts are securely united while at the lower part they are held together by a band $d^3$ shrunk or driven thereon and the sides of the case or sleeve $d$ are at a suitable elevation formed with ears $d^4$ adapted to engage the lugs $c^4$ so that the case $d$ rests thereon.

The case or sleeve $d$ is formed unequally hexagonal in horizontal section and on the interior and opposite sides are formed a number of flat projections $d^5$ which serve as wearing surfaces while the spaces between them are adapted to retain or secrete grease for lubricating purposes.

Within the case or sleeve $d$ are arranged two vertically movable cleaning blades $e$, $f$, the one $e$ is designed to clean the tread $b'$ of the rail $b$ and the other $f$ serves to clear the groove $b^2$ thereof as shown at Fig. 2.

The tread blade $e$ is shaped to the conformation of that part of the interior of the case or sleeve $d$ in which it works and it rests against the wearing surfaces $d^5$ thereof so that the frictional contact of the blade $e$ and case or sleeve $d$ is reduced as much as possible and said blade is formed with a hollow or recess $e'$ and is open at one side. The blade $e$ is at its upper part formed solid, that is, with a head $e^2$ which is vertically bored at $e^3$ and tapped to receive a screw and act as a nut thereto and in connection therewith is employed a long screw $e^4$ which extends through the nut and through the intervention of spring, hereinafter referred to, accomplishes the adjustment of the blade $e$ with relation to the rail $b$ and the regulation of the pressure exercised by the blade thereon, and the screw $e^4$ is received into the hollow or recess $e'$ and is boxed in and protected from dirt and other extraneous matter by the other or groove blade $f$ which fits against the edges of the hollow blade $e$ and forms a cover thereto.

Extending across the top of the case or sleeve $d$ and resting thereon is a bridge piece $g$ having depending lugs $g'$ which embrace the case or sleeve $d$ and that part of the screw $e^4$ above the head or nut $e^2$ of the blade $e$ passes through a plain hole in said bridge piece $g$. The bridge piece $g$ is provided with a pin or stud $g^2$ at each end thereof and the webs of the ears $d^4$ are formed with holes $d^6$ therein and extending between the ends $g^2$ of the bridge piece $g$ and the ears $d^4$ are helical extension springs $g^3$ which at their upper ends are formed with eyes $g^4$ which fit upon the pins or studs $g^2$ where they the secured by washers $g^5$ and split pins $g^6$ and at their lower ends the springs $g^3$ are provided with hooks $g^{6*}$ which engage the holes $d^6$ in the webs of the ears $d^4$.

The springs $g^3$ serve to hold the bridge piece $g$ in position but another office is to automatically increase the pressure of the blade $e$ on the tread $b'$ of the rail $b$ when extra pressure is required in order to clean an exceptionally dirty rail or when the same is coated with ice, the extra thickness of which necessarily raises the blade $e$ and increases the tension of the springs $g^3$.

Fixed to the top part of the screw $e^4$ is a boss $e^5$ having a forked upper end $e^{5*}$ and in the fork is pivotally mounted the inner end of a handle or lever $e^6$ by the aid of which the screw $e^4$ may be turned and which is adapted to fold down and lie snugly on the top of the device when not in use, but the handle $e^6$ need not necessarily be hinged to its boss.

On the boss $e^5$ to which the handle $e^6$ is pivoted is provided a lug $e^7$ and on the bridge piece $g$ is formed a coacting lug $g^7$ which, when the handle $e^6$ and consequently the screw $e^4$ has been turned the required number of revolutions to exert the maximum pressure on the blade $e$, is engaged by the lug $e^7$ of the handle which rises with the screw into the plane of the lug $g^7$ and further motion of the handle in the same direction is prevented.

Between the boss $e^5$ of the handle or lever $e^6$ and the top of the bridge piece $g$ is interposed a helical spring or spring washer $e^8$ which encircles the upper part of the screw $e^4$ and is thereby maintained in position and this spring acts as a cushion between the boss $e^5$ of the screw $e^4$ and the bridge piece $g$. Immediately below the bridge piece $g$ the screw $e^4$ is formed with a collar or shoulder $e^{4*}$ and between the underside of the bridge piece $g$ and the top of the collar or shoulder $e^{4*}$ is arranged a helical spring or spring washer $e^9$ designed to furnish the pressure necessary for forcing the blade $e$ on to the tread $b'$ of the rail $b$.

$d^8$ are stops on the interior of the case or sleeve $d$ and $e^{2*}$ are coacting projections on the head of the blade $e$ for limiting the downward motion of the latter. The groove blade $f$ is at its edges also inclined or shaped to the interior conformation of that part of the case $d$ in which it works and it is formed with a groove $f'$ on one face to receive a long screw $f^4$ while at its upper end it is formed with a head $f^2$ provided with a nut $f^3$ in which the screw $f^4$ works.

Extending across the top of the case or sleeve $d$ and resting therein is a bridge piece $h$ having depending lugs $h'$ which embrace the case or sleeve $d$ and that part of the screw $f^4$ above; the nut $f^3$ passes through a plain hole in said bridge piece $h$. The bridge piece $h$ is provided with a pin or stud $h^2$ at each end thereof and the webs of the ears $d^4$ are formed with holes $d^6$ therein and extending between the bridge piece $h$ and the ears $d^4$ are helical extension springs $h^3$ which at their upper ends are formed with eyes $h^4$ which fit upon the pins or studs $h^2$ where they are secured by washers $h^5$ and split pins $h^6$ and at their lower ends the springs $h^3$ are provided with hooks $h^{6*}$ which engage the holes $d^6$ in the webs of the ears $d^4$. The springs $h^3$ have a similar action to those $g^3$ upon the bridge piece $g$ and blade $e$ as hereinbefore described.

Fixed to the top part of the screw $f^4$ is a boss $f^5$ having a forked upper end $f^{5*}$ and in this fork is pivotally mounted the inner end of a handle or lever $f^6$ by the aid of which the screw $f^4$ may be turned and which is adapted to fold down and lie snugly on the top of the device when not in use, but the handle $f^6$ need not necessarily be hinged to its boss.

On the boss $f^5$ of the handle $f^6$ is provided a lug $f^7$ and on the bridge $h$ is formed a coacting lug $h^7$ which, when the handle $f^6$ and consequently the screw $f^4$ has been turned the required number of revolutions to exert the maximum pressure on the blade $f$, is engaged by the lug $f^7$ of the handle, which rises with the screw into the plane of the lug $f^4$, and further motion of the handle in the same direction is prevented. Between the boss $f^5$ of the screw $f^4$ and the top of the bridge piece $h$ is interposed a helical spring or spring washer $f^8$ which encircles the upper part of the screw $f^4$ and is thereby maintained in position and this spring acts as a cushion between the boss $f^5$ of the screw $f^4$ and the bridge piece $h$. Immediately below the bridge piece $h$ the screw $f^4$ is formed with a collar or shoulder $f^{4*}$ and between the bridge piece $h$ and the collar or shoulder $f^{4*}$ is arranged a helical spring or spring washer $f^9$ designed to furnish the pressure necessary for forcing the blade $f$ in the groove $b^2$ of the rail $b$.

$d^9$ are stops on the interior of the case or sleeve $d$ and $f^{2*}$ are coacting projections on the head of the blade $f$ for limiting the downward motion of the latter.

On either of the blades meeting an obstruction or when the vehicle is turning a sharp curve it is necessary that the case or sleeve $d$ should be free to give or assume a suitable angle either in the direction of the track $b$ or transversely thereof as shown in Figs. 18 and 19. For this purpose the case or sleeve is by its ears $d^4$ supported on the tapered lugs $c^4$ of the bracket $c$ so that it is capable of rocking under the conditions above described and in order to hold it normally in a vertical position and yet allow of the required rocking movement the case or sleeve $d$ is controlled by four powerful helical springs $i$ disposed at suitable angles and at their upper ends formed with eyes $i'$ fitting with studs $d^7$ on the top of the case or sleeve $d$ and at their lower ends provided with hooks $i^2$ which engage holes in the bracket $c$.

In continued use the blades $e$ $f$ are liable by the action of constant hammering and rubbing to enlarge the openings of the cases or sleeves at their lower ends and in order to obviate this each case or sleeve $d$ is in suitable positions formed with vertical recesses $h^8$ at their upper ends terminating in holes $h^9$ and in each of these recesses is fitted a spring wearing piece $j$ formed of hardened steel or other suitable material but the upper part of the wearing piece $j$ is cranked to form a lug $j'$ which extends through the hole $h^9$ in the case or sleeve $d$ and is left soft so that it may be bent down or clenched as shown in Fig. 10 in order to retain the wearing piece $j$ in position while by straightening it as shown by the dotted lines in said figure the wearing piece $j$ may, when worn or broken, be removed and replaced by a new one.

The general operation of the blade controlling mechanism may be described as follows and inasmuch as the mechanism is identical in respect of both blades it is thought that a description of the action of one blade will suffice. Assuming the blade $e$ to be in its raised or inoperative position then the cushion spring or washer $e^8$ is more or less closed under the weight of the blade and connected parts as shown more particularly at Figs. 12, 13 and 14, and the pressure spring or washer $e^9$ is open and consequently does not exert any pressure upon the screw $e^4$ and blade $e$. When however it is required to bring the blade $e$ into operative position with relation to the rail $b$ the handle $e^6$ is turned to the left and the screw $e^4$ acts upon the nut $e^3$ in the head $e^2$ of the blade $e$ and the blade is lowered and brought into contact with the rail $b$. By continuing to turn the handle $e^6$ in the same direction the screw $e^4$, by reason of the resistance of the rail to the blade, rises and consequently removes or reduces the pressure of the boss $e^5$ upon the cushion spring or washer $e^8$ and allows the same to expand while at the same time the pressure spring or washer $e^9$ is compressed between the shoulder $e^{4*}$ of the screw $e^4$ and the bridge piece $g$ against the superior force of the extension springs $g^3$ by which the bridge piece $g$ is held down and a comparatively light pressure is thus exerted on the blade $e$ while by continuing to turn the handle $e^6$ the screw $e^4$ rises farther and takes an abutment against the bridge piece $g$ which is controlled by the extension spring $g^3$ and the turning of the handle $e^6$ may be continued until the lug $e^7$, by the rising of the screw $e^4$, comes against the stop $g^7$ which is an indication that the maximum pressure of the blade $e$ upon the rail $b$ has been reached.

It will be obvious that by suitably manipulating the handle $e^6$ any desired degree of pressure within certain limits may be applied to the blade $e$. In the event of either blade meeting with an obstruction such as a more or less solid deposit of dirt on or in the rail $b$ the blade screw and bridge piece will rise bodily against the force of the extension springs, thereby automatically affording additional pressure to clear away the obstruction.

Referring to Figs. 20 to 26 inclusive the stop $h^7$ for limiting the motion of the screw $f^4$ instead of being arranged on top of the bridge piece $h$ is formed on the underside of said bridge piece and the lug $f^7$ which coacts therewith instead of being formed with the boss $f^5$ of the handle $f^6$ is in this example formed on the collar $f^{4*}$ fixed to the screw $f^4$ but the action is identical with that hereinbefore described. In this example the blade $f$ is at its edges formed with ratchet like staggered flutings $f^{10}$ which, as sections of the blade are worn off in use, present new and comparatively sharp angles inclined to the rail and which are opposed to any matter which may be deposited thereon.

It will be understood that although the above modifications are shown and described in connection with the blade $f$, screw $f^4$ and bridge piece $h$ they are equally applicable to the blade $e$, screw $e^4$ and bridge piece $g$. In cases where only the blade $e$ or that $f$ is required for use, the other blade may be omitted from the device or placed out of action.

By the means hereinbefore described a rail cleaning device of a simple and effective character is obtained in which the blades are held upon the rail with a very elastic spring pressure capable of regulation, while inasmuch as the device is adapted bodily to swing away from obstructions or to accommodate itself to sharp curves under the control of powerful tension springs a better effect is obtained in practice; furthermore the provision for the relief and repair of wearing surfaces renders the device of a more practical character than heretofore.

Having now particularly described and ascertained the nature of the said invention and in what manner the same is to be performed we declare that what we claim is:—

1. In a rail cleaning device, a bracket adapted to be fixed to the frame of a vehicle, a case or sleeve loose within the bracket, means for supporting the case or sleeve upon the bracket with capability of oscillation, blades vertically slidable within the case or sleeve and at their lower ends shaped to engage the tread and groove of the rail, respectively, and springs acting on the blades to cause them to bear with a spring pressure upon the rail as set forth.

2. In a rail cleaning device, a bracket adapted to be fixed to the frame of a vehicle, a casing or sleeve loose within the bracket, means for supporting the case or sleeve upon the bracket with capability of oscillation, extension springs fastened to the case or sleeve and to the bracket for controlling the oscillation of the case or sleeve, blades vertically slidable within the case or sleeve and at their lower ends shaped to engage the tread and groove of the rail respectively and springs acting on the blades to cause them to bear with a spring pressure upon the rail as set forth.

3. In a rail cleaning device, a bracket adapted to be fixed to the frame of a vehicle, a casing or sleeve loose within the bracket, means for supporting the case or sleeve upon the bracket with capability of oscillation, means for controlling the oscillation of the case or sleeve, blades vertically slidable in the case or sleeve and adapted to engage the tread and groove of the rail, nuts provided on the blades, long screws working in the nuts, bridge pieces extending across the tops of the cases or sleeves and having plain holes therein through which the upper ends of the screws extend, bosses or the like fixed to the screws above the bridge pieces, means attached to the bosses for rotating the screws, collars or shoulders upon the screws below the bridge pieces and extension springs attached to the bridge pieces and the case or sleeve for acting on the blades through the bridge pieces and screws as set forth.

4. In a rail cleaning device, a bracket adapted to be fixed to the frame of a vehicle, a casing or sleeve loose within the bracket, means for supporting the case or sleeve upon the bracket, blades vertically slidable in the case or sleeve and adapted to engage the tread and groove of the rail, bridge pieces extending across the top of the case or sleeve, long screws working in nuts on the blades and extending through plain holes in the bridge pieces, bosses or the like fixed to the screws above the bridge pieces, collars or shoulders upon the screws below the bridge pieces, helical compression springs interposed between the bosses and bridge pieces, helical springs interposed between the bridge pieces and collars or shoulders of the screws for causing the blades to bear with a spring pressure upon the rail, means for turning the screws, and extension springs attached to the bridge pieces and to the case or sleeve for acting on the blades through the bridge pieces, helical springs and screws as set forth.

5. In a rail cleaning device comprising a case or sleeve having blades slidable therein and regulated by screws working in nuts thereon and extending through bridge pieces and acted on thereby, extension springs attached to the case or sleeve and the bridge pieces and means for turning the screws comprising handles or levers having a pivotal connection therewith so as to fold down out of the way when not in use as set forth.

6. In a rail cleaning device comprising a case or sleeve having rail cleaning blades vertically slidable therein and acted upon by extension springs through the medium of bridge pieces and long screws, a longitudinal hollow or recess in one of the blades in which its screw is fitted and covered by the other blade and a longitudinal groove in the latter blade in which its screw is fitted as set forth.

7. In a rail cleaning device, a case or sleeve having rail clearing blades vertically slidable therein, bridge pieces extending across the top, long screws extending through the bridge pieces and engaging nuts on the blades, bosses fixed to the screws above the bridge pieces and provided with means for turning the screws, extension springs for acting upon the blades through the bridge pieces and screws, lugs or offsets fixed to the screws and stops carried by parts fixed against rotation, said stops being arranged in the paths traversed by the lugs when the maximum pressure has been applied to the blades by the turning of the screws as set forth.

8. In a rail cleaning device comprising a case or sleeve having rail clearing blades vertically slidable therein and acted upon by springs, recesses or pockets terminating in holes formed interiorly of the casing or sleeve at the lower part thereof and hardened steel spring wearing pieces fitted into said pockets and at their upper ends cranked to extend through the holes and softened at that part so as to adapt said cranked parts to be clenched as set forth.

9. In a rail cleaning device comprising a case or sleeve having blades slidable therein, the edges of the blades being provided with flutings or indentations arranged in staggered fashion as set forth, so as always to expose the cutting edge as the bottom of the blade is worn down.

In witness whereof we have hereunto set our hands in the presence of two witnesses.

GEORGE WILLIAM GREEN.
JOHN McILVAINE CATER.

Witnesses:
C. H. WHITE,
HERBERT D. JAMESON.

---

Copies of this patent may be obtained for five cents each, by addressing the "Commissioner of Patents, Washington, D. C."